(12) United States Patent
Zhou et al.

(10) Patent No.: US 9,563,303 B2
(45) Date of Patent: Feb. 7, 2017

(54) EMBEDDED CAPACITIVE TOUCH DISPLAY PANEL AND EMBEDDED CAPACITIVE TOUCH DISPLAY DEVICE

(71) Applicants: SHANGHAI TIANMA MICRO-ELECTRONICS CO., LTD., Shanghai (CN); TIANMA MICRO-ELECTRONICS CO., LTD., Shenzhen, Guangdong Province (CN)

(72) Inventors: Xingyao Zhou, Shanghai (CN); Qijun Yao, Shanghai (CN); Hao Chen, Shanghai (CN); Jun Ma, Shanghai (CN); Liang Liu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/231,426

(22) Filed: Aug. 8, 2016

(65) Prior Publication Data
US 2016/0342256 A1 Nov. 24, 2016

Related U.S. Application Data

(63) Continuation-in-part of application No. 14/284,279, filed on May 21, 2014, now Pat. No. 9,436,327.

(30) Foreign Application Priority Data

Jul. 30, 2013 (CN) .......................... 2013 1 0326797

(51) Int. Cl.
*G02F 1/1335* (2006.01)
*G06F 3/041* (2006.01)
(Continued)

(52) U.S. Cl.
CPC ......... *G06F 3/0412* (2013.01); *G02F 1/13338* (2013.01); *G02F 1/13439* (2013.01);
(Continued)

(58) Field of Classification Search
None
See application file for complete search history.

(56) References Cited

U.S. PATENT DOCUMENTS

| 2011/0007030 A1* | 1/2011 | Mo | G06F 3/044 345/174 |
| 2012/0169631 A1* | 7/2012 | Ahn | G06F 3/044 345/173 |
| 2014/0313434 A1* | 10/2014 | Kim | G02F 1/13338 349/12 |

\* cited by examiner

*Primary Examiner* — Richard Kim
(74) *Attorney, Agent, or Firm* — Alston & Bird LLP

(57) ABSTRACT

The application disclose an embedded capacitive touch display panel and an embedded capacitive touch display device, including: a first transparent substrate and a second substrate arranged opposite to each other, a grid-shaped metal conductive layer formed on the first transparent substrate, and a number of force touch detection electrodes independent of each other formed on the second substrate, wherein the embedded capacitive touch display panel further includes a color filter layer including at least red color resists, green color resists, and blue color resists, wherein the color resists in the same colors are arranged in respective color resist bars, and the color resist bars including green color resist resistance strips; and the grid-shaped metal conductive layer includes periodically arranged force touch fixed potential electrodes and floating electrodes, wherein the force touch fixed potential electrodes are separate from the floating electrodes with gaps being formed between them, and the gaps include first gap sections which are parallel to the color resist bars, and which do not overlap with the green color resist resistance strips. Since the green (Continued)

color resists contribute to display brightness far more than the color resists of the other colors, the first gap sections can be arranged so that they do not overlap with the green color resist resistance strips to thereby alleviate the problem of a visible pattern of the grid-shaped metal conductive layer so as to improve the display performance of the embedded capacitive touch display panel without degrading a touch effect.

13 Claims, 15 Drawing Sheets

(51) Int. Cl.
*G06F 3/044* (2006.01)
*G02F 1/1343* (2006.01)
*G02F 1/1333* (2006.01)
*G02F 1/1368* (2006.01)

(52) U.S. Cl.
CPC .. *G02F 1/133514* (2013.01); *G02F 1/134309* (2013.01); *G06F 3/044* (2013.01); *G06F 3/0414* (2013.01); *G02F 1/1368* (2013.01); *G02F 1/133512* (2013.01); *G02F 2201/121* (2013.01); *G02F 2201/124* (2013.01); *G02F 2201/52* (2013.01); *G06F 2203/04107* (2013.01); *G06F 2203/04111* (2013.01); *G06F 2203/04112* (2013.01)

---Prior Art---

---Prior Art---

---Prior Art---

---Prior Art---

EMBEDDED CAPACITIVE TOUCH DISPLAY PANEL AND EMBEDDED CAPACITIVE TOUCH DISPLAY DEVICE

CROSS REFERENCE TO RELATED APPLICATIONS

This application is a continuation-in-part application of the U.S. application Ser. No. 14/284,279, filed on May 21, 2014, which claims priority to Chinese Application No. 201310326797.X, filed Jul. 30, 2013, the contents of all of which are incorporated herein by reference in their entirety for all purposes.

TECHNICAL FIELD

The present application relates to the field of embedded capacitive touch display, and particularly relates to an embedded capacitive touch display panel and an embedded capacitive touch display device including the embedded capacitive touch display panel.

BACKGROUND OF THE APPLICATION

An embedded touch screen does not need a traditional externally-mounted touch screen, is formed by designing an integrated touch electrode structure at a color filter (CF) side, and can realize the need of lightening and thinning of a display panel. Generally, a touch electrode structure is designed to be provided with longitudinal driving electrodes and transversal sensing electrodes, wherein the sensing electrodes at both sides of each driving electrode are connected by a crossing bridge. Certainly, the positions and the connection modes of the driving electrodes and the sensing electrodes are not limited, the sensing electrodes can be longitudinal and the driving electrodes can be transversal in an electrode structure design, and the driving electrodes at both sides of each sensing electrode are connected by a metal crossing bridge. In addition, patterns of touch electrodes can be various, wherein rhombus is the most basic pattern design in the prior art, but different electrode pattern designs can be selected for realizing different functions.

The specific structure of a liquid crystal display screen of an embedded touch screen in the prior art is as shown in FIG. 1, the liquid crystal display screen mainly includes an upper substrate 12 (namely, color filter (CF) side), a lower substrate 11 (TFT side), and a liquid crystal layer 10 located between the upper substrate 12 and the lower substrate 11, wherein the CF side is integrated with a black matrix 13 (BM), a touch electrode layer 14, a color filter layer 15 (which mainly includes a red color resist (R), a green color resist (G) and a blue color resist (B)), a metal crossing bridge layer 16 (which can also be a transparent oxide crossing bridge) and a over coat layer 17 (OC), respectively. The lower substrate 11 side is mainly integrated with a TFT array structure layer 19 and a transparent pixel electrode (ITO) layer 18 on the TFT array.

As shown in FIG. 2 and FIG. 3, FIG. 3 is an enlarged view of a dotted line box (part A) in FIG. 2, the metal touch electrode layer 14 includes sensing electrodes 141 and driving electrodes 142 which are mutually insulated and located on the same layer, in order to insulate the sensing electrodes 141 from the driving electrodes 142, the sensing electrodes and the driving electrodes are separated to form gaps 1, so as to achieve the insulating purpose. In addition, the metal touch electrode layer 14 is grid-shaped and shielded by the black matrix 13. Generally, the formed gaps are located on the color filter layer, and randomly located on the red color resist (R), the green color resist (G) or the blue color resist (B). As shown in FIG. 1, when a liquid crystal display works, because a light L emitted by a backlight module is irradiated on the metal touch electrode layer 14, the light L is partly reflected on the channels of TFTs on the TFT array structure layer of the lower substrate 11 by the metal touch electrode layer 14 to cause an electricity leakage phenomenon of the TFTs. However, at the gaps 1, due to the absence of the metal touch electrode layer 14, when the light L of a backlight source is irradiated, a light-reflecting phenomenon is very weak, and the reason for this is that there is no any direct reflecting light in a vertical direction, the reflecting phenomenon of the light at an adjacent position in a slanting direction is only in a very small angle range, and the slanting reflected light has no obvious influence on the TFTs which are just opposite to the gaps 1, so that a corresponding TFT off-state current is low. All the TFTs corresponding to the color resists at the gaps 1 are not vertically irradiated by the reflected light, the display effect of the TFTs at the gaps are different from the display effect at non-gap parts, and when the intensity of the backlight source is increased or the TFT off-state current is increased, the patterns of the gaps between the sensing electrodes and the driving electrodes are highlighted on the liquid crystal display screen.

BRIEF SUMMARY OF THE APPLICATION

In view of this, embodiments of the application provide an embedded capacitive touch display panel and an embedded capacitive touch display device. In an aspect, an embodiment of the application provides an embedded capacitive touch display panel including: a first transparent substrate and a second substrate arranged opposite to each other, a grid-shaped metal conductive layer formed on the first transparent substrate, and a number of force touch detection electrodes independent of each other formed on the second substrate, wherein:

the embedded capacitive touch display panel further includes a color filter layer including at least red color resists, green color resists, and blue color resists, wherein the color resists in the same colors are arranged in respective color resist bars, and the color resist bars include green color resist resistance strips; and the grid-shaped metal conductive layer includes periodically arranged force touch fixed potential electrodes and floating electrodes, wherein the force touch fixed potential electrodes are separate from the floating electrodes with gaps being formed between them, and the gaps include first gap sections which are parallel to the color resist bars, and which do not overlap with the green color resist resistance strips.

In another aspect, an embodiment of the application further provides an embedded capacitive touch display device including the embedded capacitive touch display panel above according to the embodiment of the application.

BRIEF DESCRIPTION OF THE DRAWINGS

In order to describe the technical solutions in the embodiments of the present application more clearly, the drawings which are needed in the description of the embodiments will be briefly introduced as follows, obviously, the drawings in the following description are only some of the embodiments of the present application, and for those of ordinarily skilled in the art, other drawings can also be obtained in accordance with these drawings without any creative effort.

DETAILED DESCRIPTION OF THE PREFERRED EMBODIMENTS

Figure 1:
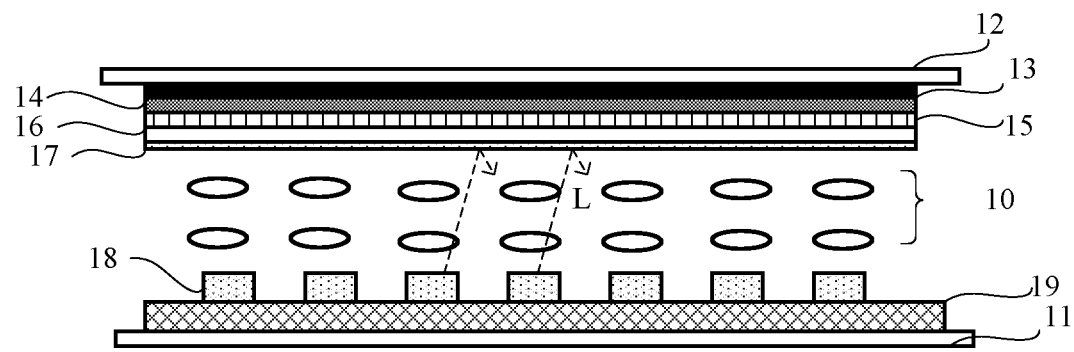
FIG. 1 is a structural schematic view of an embedded touch liquid crystal display screen in the prior art.
Figure 2:
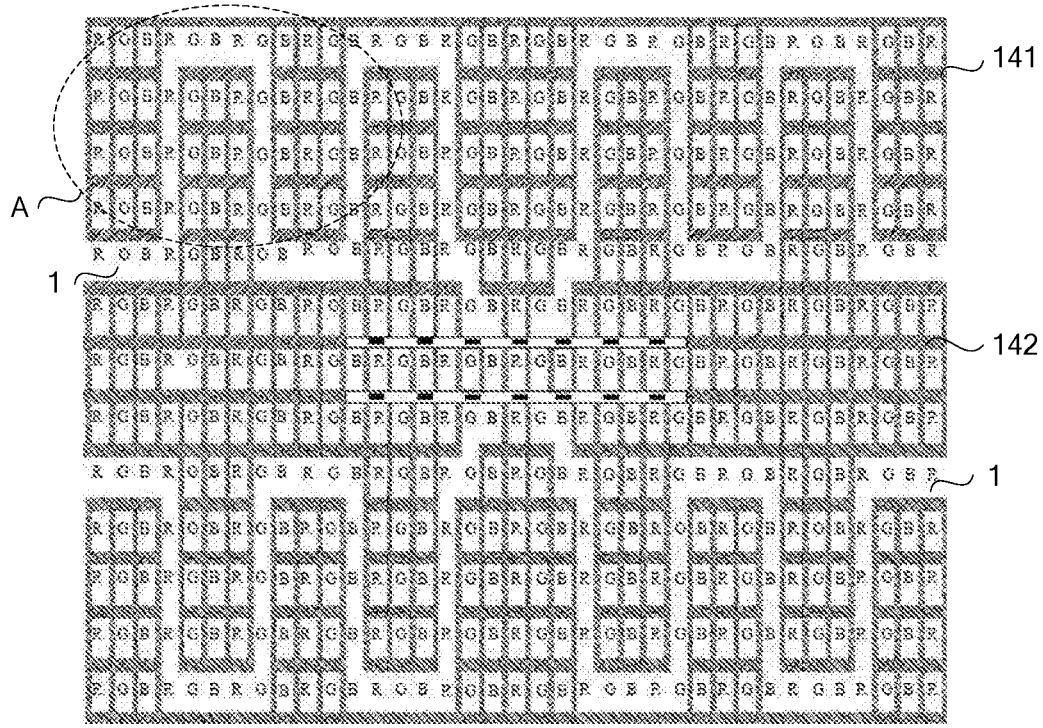
FIG. 2 is a pattern of gaps between sensing electrodes and driving electrodes of the embedded touch liquid crystal display screen in the prior art.

The technical solutions in the embodiments of the present application are clearly and completely described in combination with the drawing in the embodiments of the present application, obviously, the described embodiments are only part of the embodiments of the present application, rather than all the embodiments. All the other embodiments, obtained by those of ordinarily skilled in the art in accordance with the embodiments in the application without any creative effort, fall into the protection scope of the present application.

The present application discloses an embedded capacitive touch display panel and an embedded capacitive touch display device, wherein the positions of gaps between sensing electrodes and driving electrodes in the display panel are set to keep away from a green color resist bar. Thus the visible defects of patterns of metal touch electrodes are improved, and the display performance of the embedded touch screen is improved on the premise of causing no influence on touch effect.

In the embedded touch screen, in order to improve the visible defects of the patterns of the metal touch electrodes and improve the display quality of a picture of an LCD, in the present application, from the point of optimally designing the positions where the sensing electrodes and the driving electrodes are separated to form gaps, the positions of the gaps are set to keep away from the green color resist bar, and the gaps can be formed on a red color resist bar and/or a blue color resist bar. Because the red color resist and the blue color resist are relatively low in penetration rate and cannot be easily identified by human eyes, the disadvantageous phenomenon that the human-eye can see the patterns of the touch electrodes can be effectively avoided under common customer backlight intensity specifications. Wherein in a display brightness L, the contribution rate of each color resist is shown in the following formula:

$$L=1.0000R+4.5907G+0.0601B$$

wherein R represents the red color resist, G presents the green color resist, and B represents the blue color resist. As shown in the formula aforementioned, for brightness, the contribution of the green color resist is far greater than the contribution of the red color resist and the contribution of the blue color resist, and the green color resist is brighter compared with the other adjacent color resists and easy to be sensed by human eyes during display.

Figure 3:
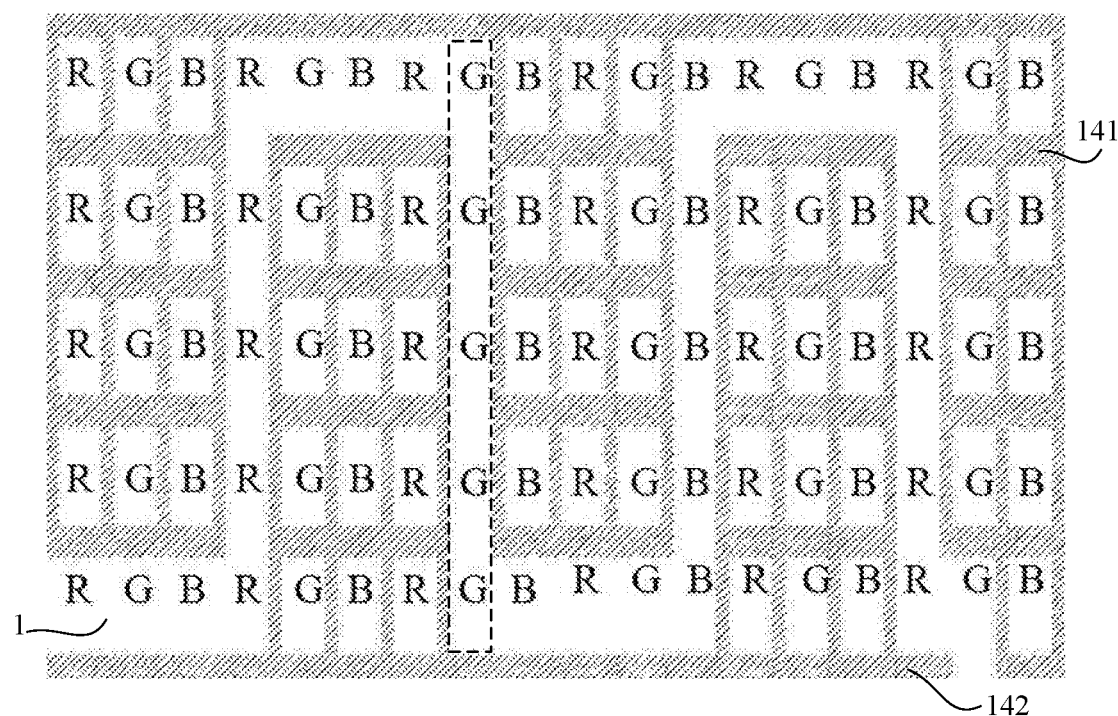
FIG. 3 is a partial enlarged view of part A in FIG. 2.
Figure 4:
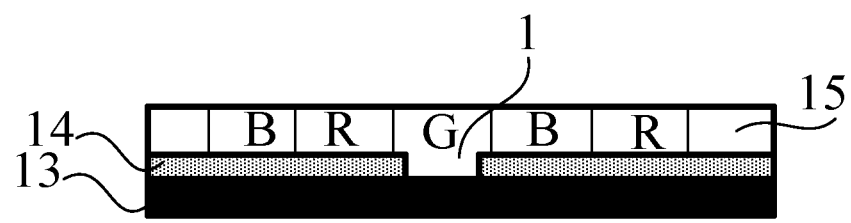
FIG. 4 is a position relationship between the gaps between the sensing electrodes and the driving electrodes, and color resists in the embedded touch liquid crystal display screen in the prior art.

For the green color resist G with a high penetration rate, if the positions of the gaps 1 correspond to the position of the green color resist bar G on the color filter layer, for example, the gaps 1 are in the position of the green color resist G as shown by the dotted line box in FIG. 3 and FIG. 4, the phenomenon is more obvious. When the intensity of the backlight source is increased or the TFT off-state current is increased, the pattern of the gaps between the sensing electrodes and the driving electrodes is highlighted on the liquid crystal display screen, in particular, when the positions of the gaps correspond to the positions of the green color resists, the phenomenon is especially obvious, and the display quality of the picture is seriously reduced.

An Embodiment

Figure 5:
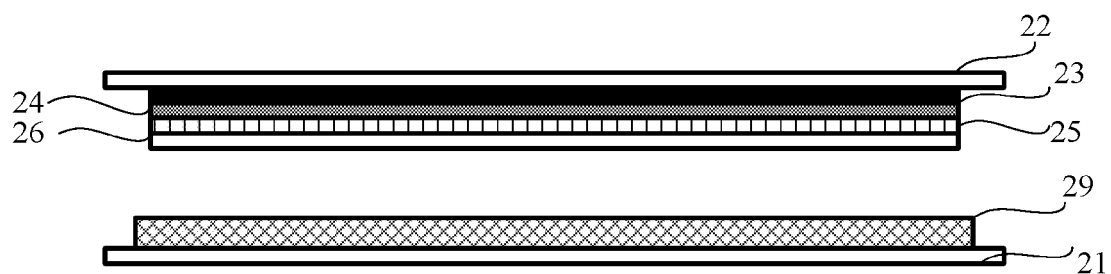
FIG. 5 is a structural schematic view of an embedded capacitive touch display panel in an embodiment.

As shown in FIG. 5 to FIG. 14, the present application discloses an embedded capacitive touch display panel, which includes: a first transparent substrate 22, a grid-shaped metal conductive layer 24 formed on the first transparent substrate 22, a black matrix layer 23 formed between the first transparent substrate 22 and the grid-shaped metal conductive layer 24 which is shielded by the black matrix layer 23, a second substrate 21 arranged opposite to the first transparent substrate 22, and a pixel element array (not shown in the figures) formed on the second substrate 21, wherein each pixel element is correspondingly provided with a TFT (not shown in the figures); a light-shading structure is not provided at one side of each TFT away from the second substrate 21, because the working performance of the TFTs is influenced due to the existence of parasitic capacitance caused by arranging the light-shading structure, therefore, a light-shading structure will not provided at one side of each TFT away from the second substrate 21, and the multiple TFTs on the second substrate 21 form a TFT structure layer 29, as shown in FIG. 5.

Figure 6:
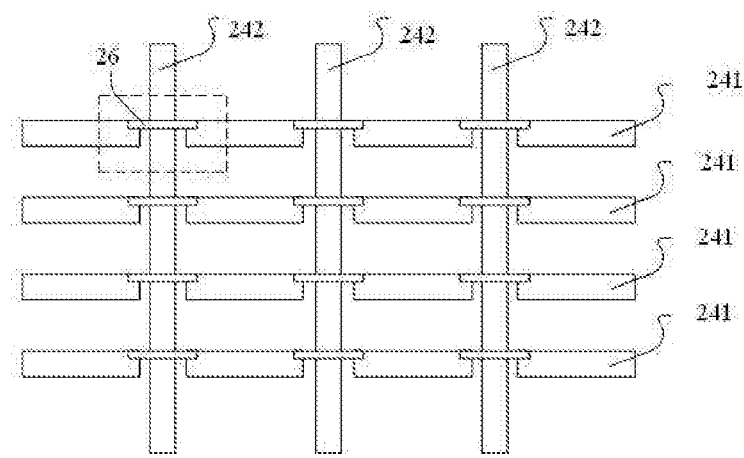
FIG. 6 is a position relationship between sensing electrodes and driving electrodes in the embedded capacitive touch display panel in an embodiment.
Figure 7:
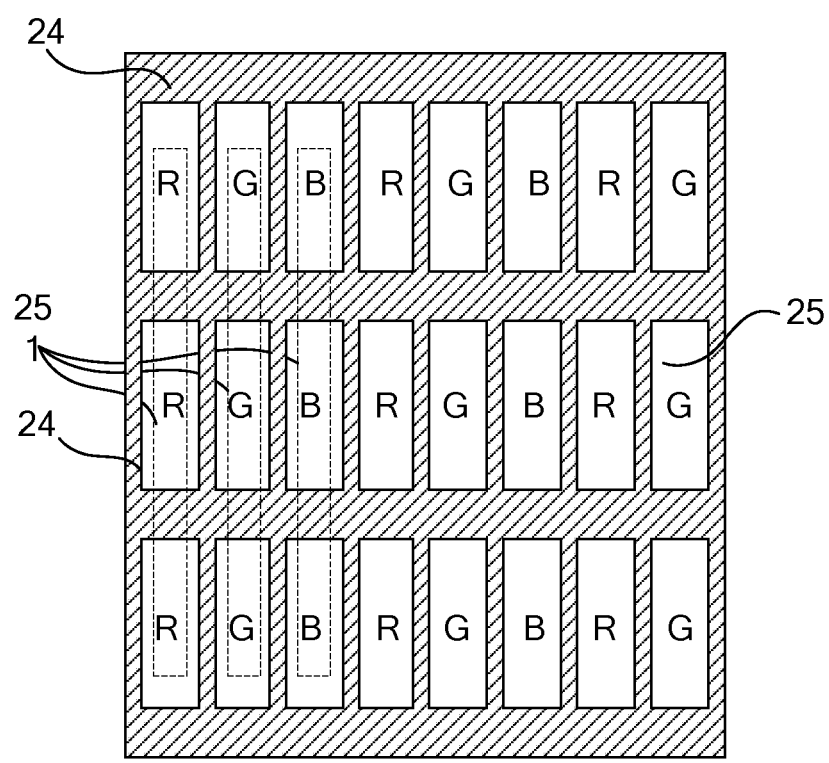
FIG. 7 is a position relationship between a color filter layer and a grid-shaped metal conductive layer in the embedded capacitive touch display panel in an embodiment.
Figure 8:
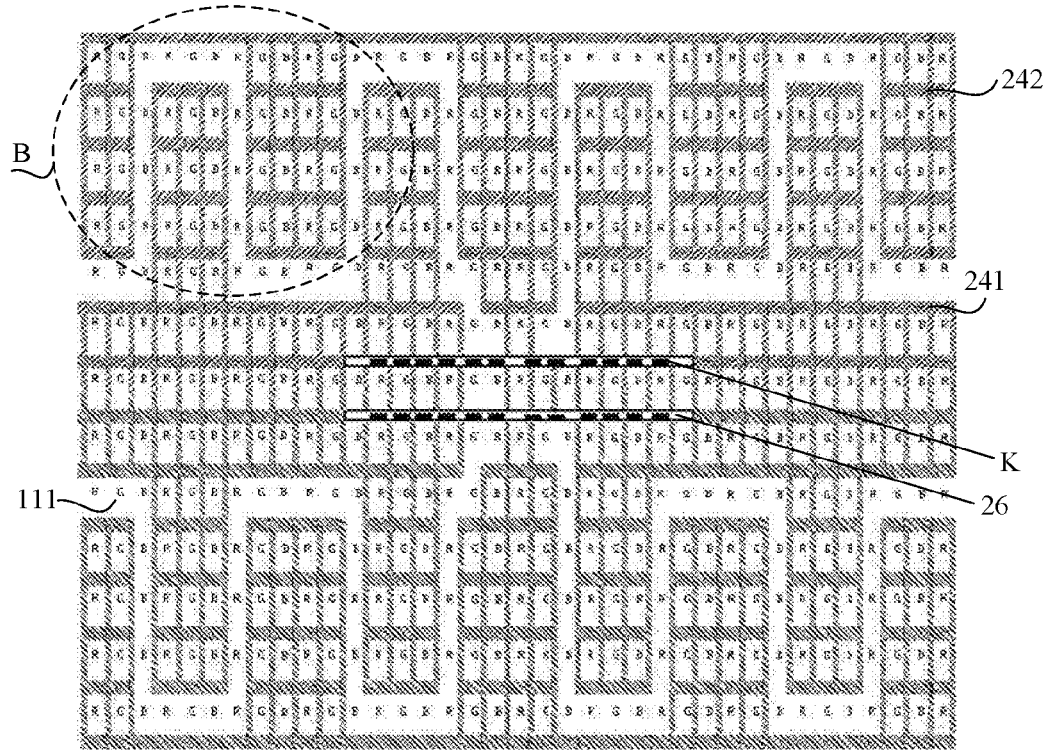
FIG. 8 is a pattern of gaps between the sensing electrodes and the driving electrodes in the embedded capacitive touch display panel in an embodiment.

As shown in FIG. 6 to FIG. 9, FIG. 9 is a partial enlarged view of part B in FIG. 8, the grid-shaped metal conductive layer 24 includes multiple first metal electrodes 242 and multiple second metal electrodes 241 crossed with the multiple first metal electrodes 242, and each of the second metal electrodes 241 is divided into multiple sections by the multiple first metal electrodes 242; and the first metal electrodes 242 and the second metal electrodes 241 are separated from each other and form gaps 111, as shown in FIG. 6, wherein the first metal electrodes 242 are sensing electrodes, and the second metal electrodes 241 are driving electrodes.

As shown in FIG. 5 and FIG. 7, the embedded capacitive touch display panel further includes a color filter layer 25, wherein the color filter layer 25 includes red color resist units R, green color resist units G and blue color resist units B, and the color resist units with the same color are arrayed to form a color resist bar 251. Wherein the color resist bars 251 include a red color resist bar R, a green color resist bar G and a blue color resist bar B, the three color resist bars are mutually parallel or substantially parallel. In addition, each pixel element corresponds to one color resist unit, a part of the color resist units are surrounded by the grid-shaped metal conductive layer 24, and the TFTs in the pixel elements corresponding to the color resist units surrounded by the grid-shaped metal conductive layer 24 are shielded by the grid-shaped metal conductive layer 24. The other part of the color resist units are located at the gaps 111 formed by separation of the first metal electrodes 242 and the second metal electrodes 241, and are not surrounded by the grid-shaped metal conductive layer 24.

Figure 9:
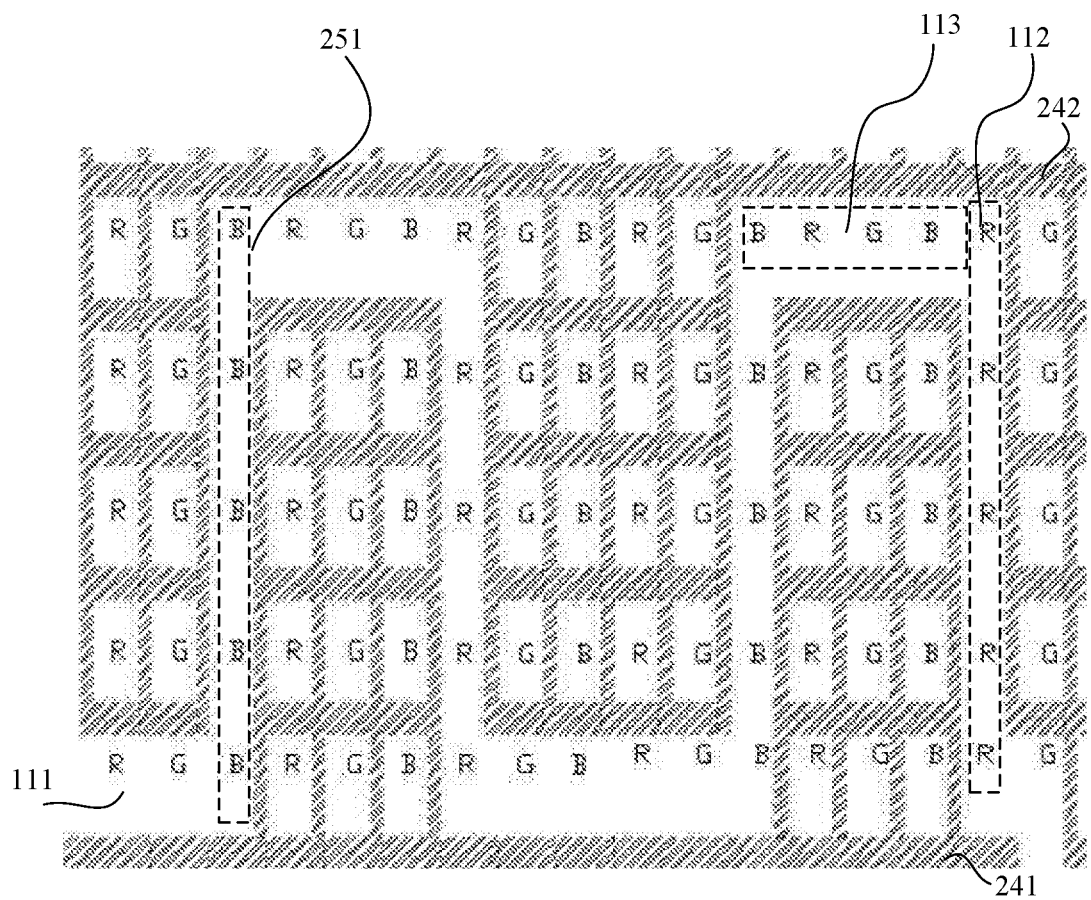
FIG. 9 is a partial enlarged view of part B in FIG. 8.
Figure 10:
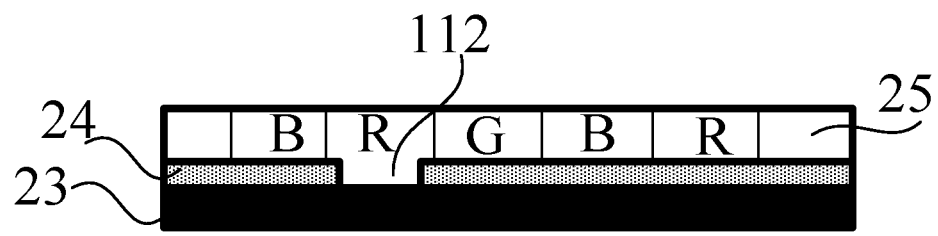
FIG. 10 is a position relationship between the gaps and color resists in the embedded capacitive touch display panel in an embodiment.
Figure 11:
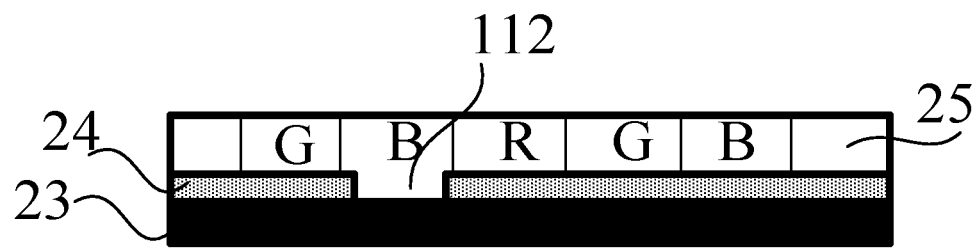
FIG. 11 is another position relationship between the gaps and the color resists in the embedded capacitive touch display panel in an embodiment.
Figure 12:
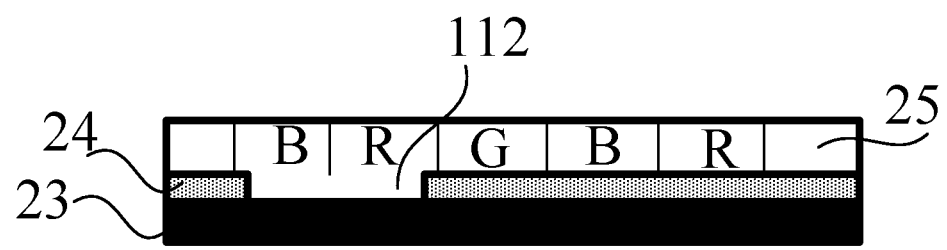
FIG. 12 is still another position relationship between the gaps and the color resists in the embedded capacitive touch display panel in an embodiment.
Figure 13:
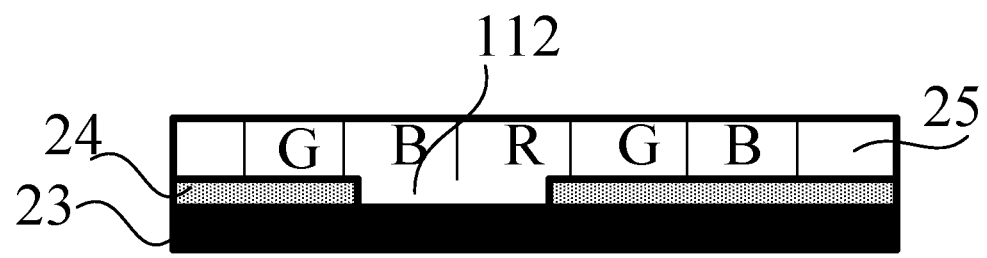
FIG. 13 is still another position relationship between the gaps and the color resists in the embedded capacitive touch display panel in an embodiment.

As shown in FIG. 9, the gaps 111 include a first gap part 112, the first gap part 112 is parallel to the color resist bars 251, and the first gap part 112 is not overlapped with the green color resist bar G, as shown in cross-sectional views of FIG. 10 and FIG. 11. In other words, the first gap part 112 parallel to the green color resist bar is kept away from the green color resist bar, or the green color resist bar parallel to the first gap part 112 is not located in the first gap part 112. As shown in FIG. 10, the first gap part 112 is arranged corresponding to the red color resist bar R; in another implementation of this embodiment, as shown in FIG. 11, the first gap part 112 is arranged corresponding to the blue color resist bar B. In still another implementation of this embodiment, as shown in FIG. 12 and FIG. 13, the first gap part 112 is arranged corresponding to the blue color resist bar B and the red color resist bar R. In addition, the gaps 111 further include a second gap part 113, and the second gap part 113 is perpendicular to the color resist bars 251, as shown in FIG. 9.

Figure 14:
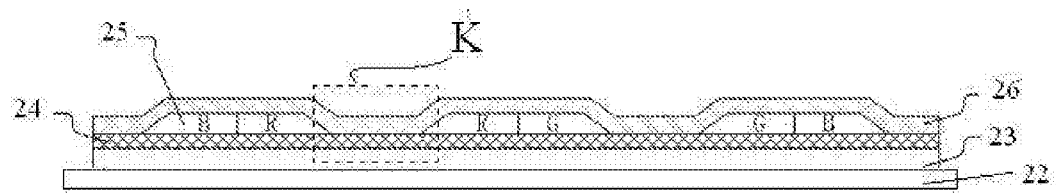
FIG. 14 is a structural schematic view of a first transparent substrate in the embedded capacitive touch display panel in an embodiment.

As shown in FIG. 5, FIG. 6 and FIG. 14, the touch display panel further includes a conductive bridging layer 26, the multiple sections of the second metal electrode 241 are connected together by the conductive bridging layer 26, and the conductive bridging layer 26 is made of a metal material or a transparent conductive material. As shown in FIG. 14, the color filter layer 25 is arranged between the grid-shaped metal conductive layer 24 and the conductive bridging layer 26, the color filter layer includes multiple via holes K, and the multiple sections of the second metal electrode 241 are connected together by the conductive bridging layer 26 through the via holes K; and the color filter layer 25 is made of an insulating and non-conducting material.

Another Embodiment

Figure 15:
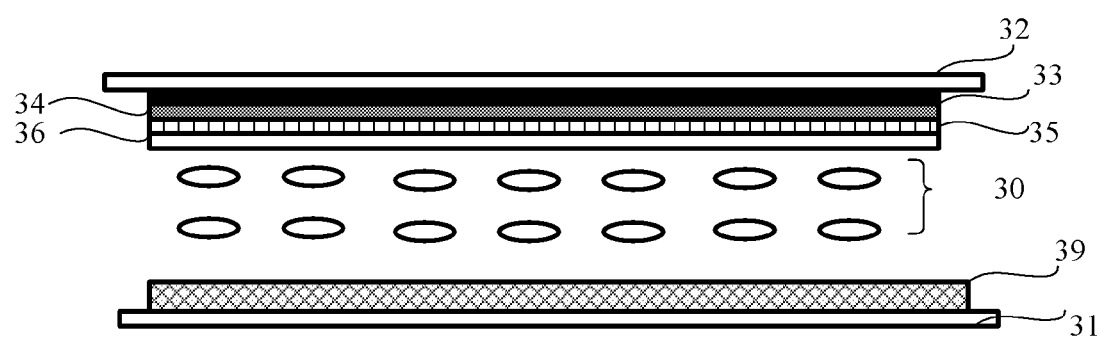
FIG. 15 is a structural schematic view of an embedded touch screen liquid crystal display in another embodiment.

This embodiment is based on the embodiment aforementioned, and the embedded capacitive touch display panel may be an embedded capacitive touch liquid crystal display. As shown in FIG. 15, the embedded capacitive touch liquid crystal display includes: a first transparent substrate 32, a grid-shaped metal conductive layer 34 formed on the first transparent substrate 32, a black matrix layer 33 formed between the first transparent substrate 32 and the grid-shaped metal conductive layer 34 which is shielded by the black matrix layer 33, a conductive bridging layer 36 located on the grid-shaped metal conductive layer 34, a color filter layer 35 located between the grid-shaped metal conductive layer 34 and the conductive bridging layer 36, a second substrate 31 arranged opposite to the first transparent substrate 32, and a pixel element array (not shown in the figure) formed on the second substrate 31, wherein each pixel element is correspondingly provided with a TFT (not shown in the figure), a light-shading structure is not provided at one side of each TFT away from the second substrate 31, and the multiple TFTs on the second substrate 31 form a TFT structure layer 39; and the embedded capacitive touch liquid crystal display further includes a liquid crystal layer 30 sandwiched between the first transparent substrate 32 and the second substrate 31. The positions of the gaps between the sensing electrodes and the driving electrodes in the touch structure in the liquid crystal display device are set to keep away from the green color resist bar. Thus the visible defects of the patterns of the metal touch electrodes are improved, and the display performance of the embedded capacitive touch liquid crystal display is improved on the premise of causing no influence on touch effect.

In addition, the embedded capacitive touch display panel in the embodiment may also be an embedded capacitive touch organic light-emitting display panel or an embedded capacitive touch color electronic paper.

Another Embodiment

Figure 16:
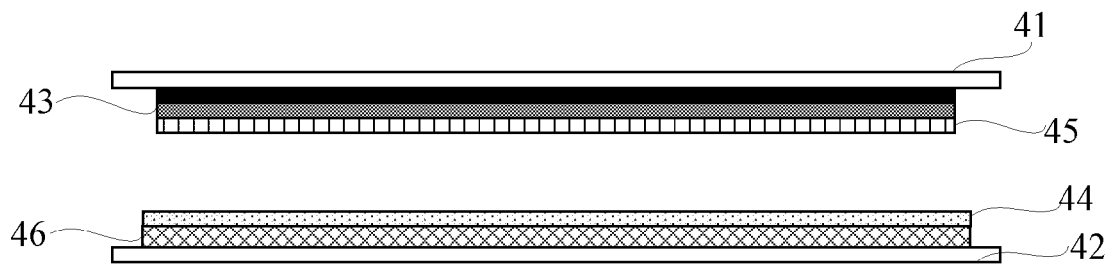
FIG. 16 illustrates a schematic structural diagram of an embedded capacitive touch display panel according to an embodiment of the application.
Figure 17:
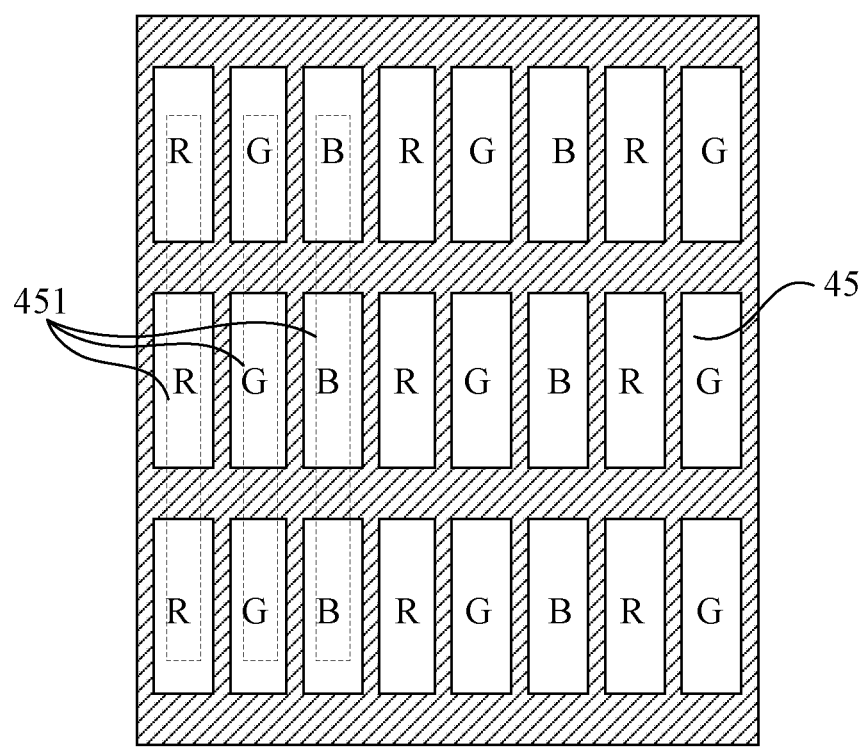
FIG. 17 illustrates a schematic structural diagram of a color filter layer in the embedded capacitive touch display panel according to the embodiment of the application.

An embodiment of the application provides an embedded capacitive touch display panel as illustrated in FIG. 16, which includes a first transparent substrate 41 and a second substrate 42 arranged opposite to each other, a grid-shaped metal conductive layer 43 formed on the first transparent substrate 41, and a number of force touch detection electrodes independent of each other formed on the second substrate 42;

As illustrated in FIG. 16, the embedded capacitive touch display panel further includes a color filter layer 45 as illustrated in FIG. 17, which includes at least red color resists R, green color resists G, and blue color resists B, where the color resists in the same colors are arranged in respective color resist bars 451, and the color resist bars 451 include green color resist resistance strips.

Figure 18:
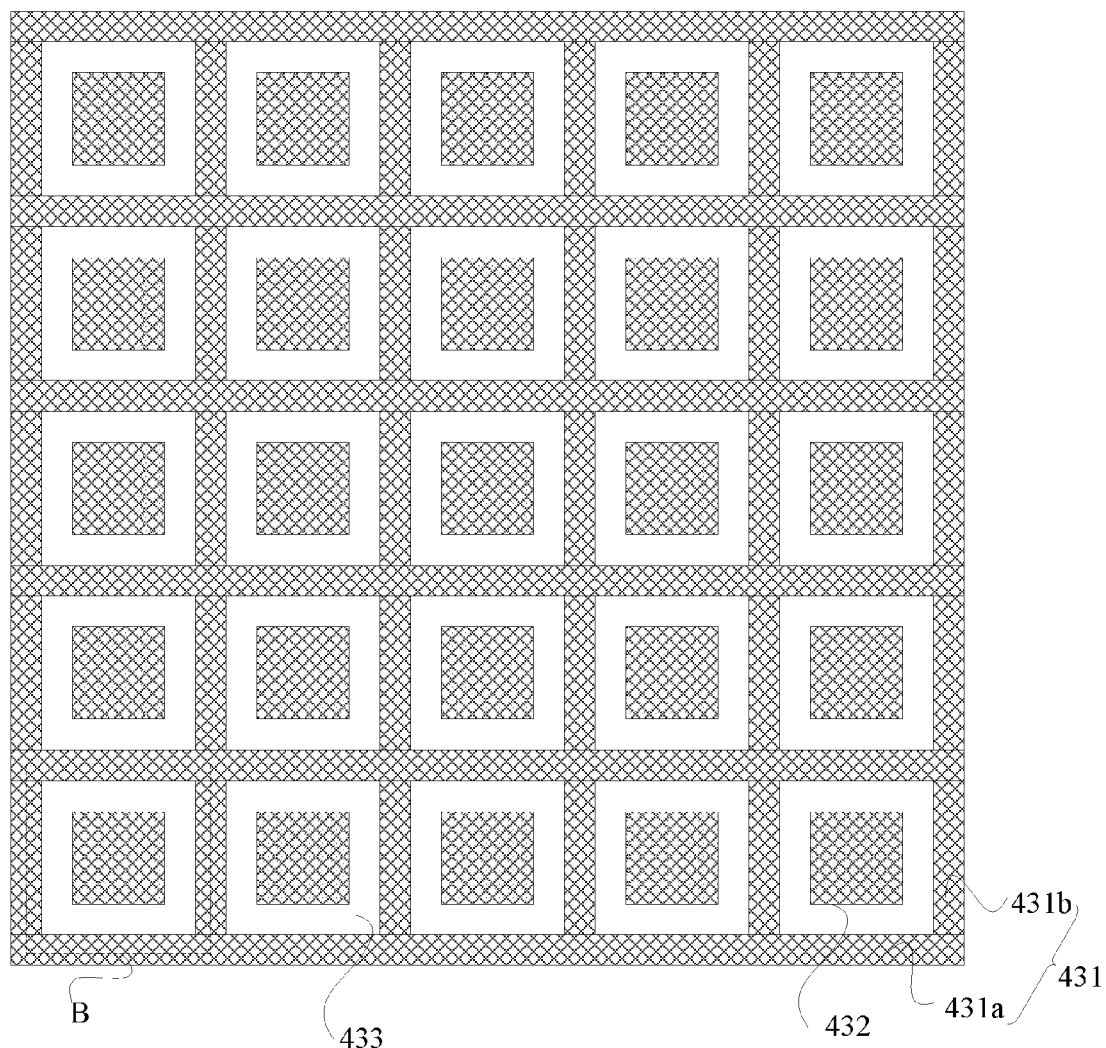
FIG. 18 illustrates a schematic diagram of floating electrodes and force touch fixed potential electrodes in the embedded capacitive touch display panel according to the embodiment of the application.
Figure 19:
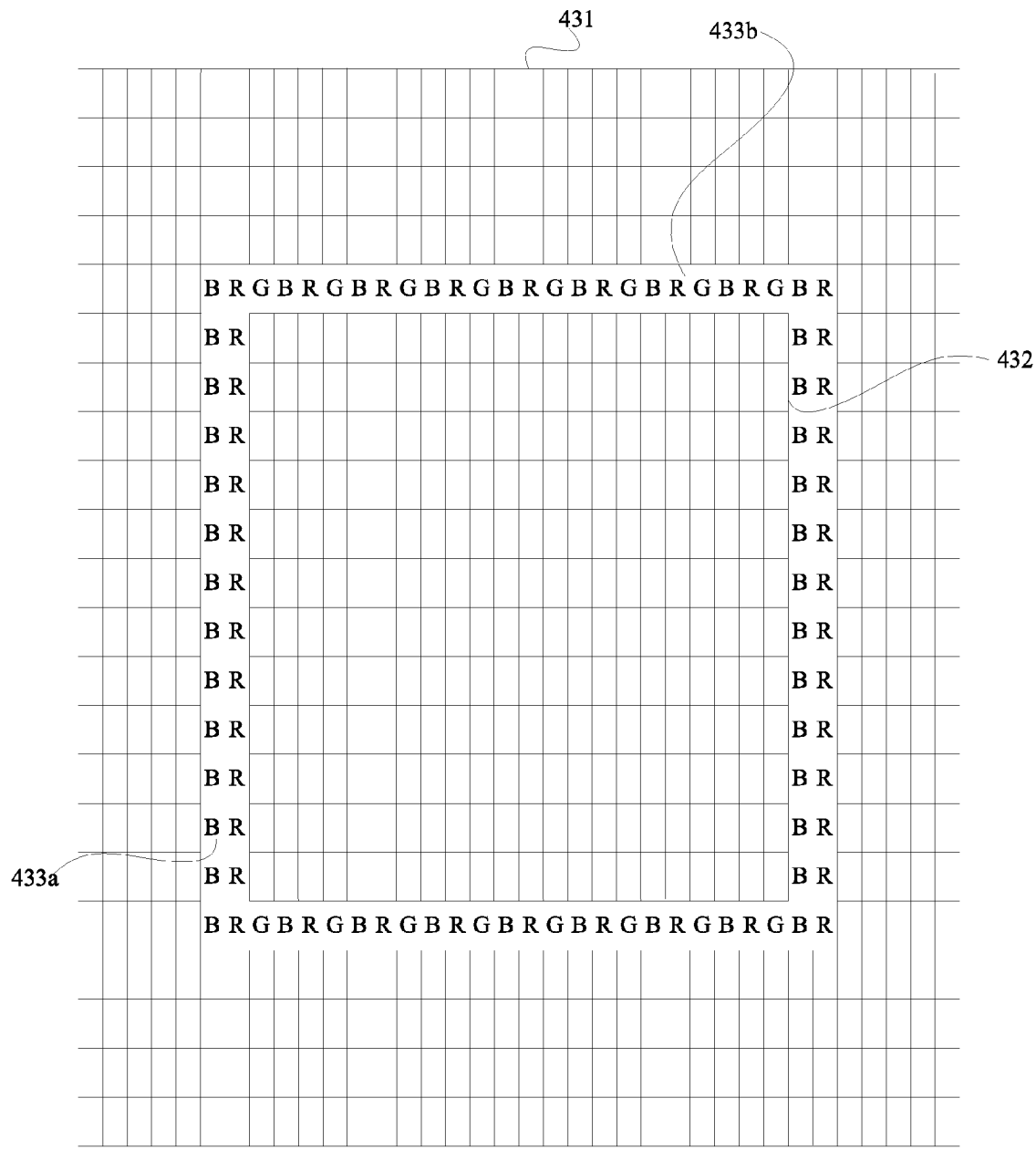
FIG. 19 illustrates a partially enlarged diagram at B in FIG. 18.

As illustrated in FIG. 18, the grid-shaped metal conductive layer 43 includes force touch fixed potential electrodes 431 and floating electrodes 432, where the force touch fixed potential electrodes 431 are separate from the floating electrodes 432 with gaps 433 being formed between them; and as illustrated in FIG. 19 which is an enlarged diagram of the section in the dashed-line box B in FIG. 18, the gaps 433 include first gap sections 433a which are parallel to the color resist bars 451, and which do not overlap with the green color resist resistance strips.

In the embedded capacitive touch display panel according to the embodiment of the application, the first gap sections 433a are arranged so that they do not overlap with the green color resist resistance strips, and since the green color resists contribute to display brightness far more than the color resists of the other colors, the first gap sections 433a can be arranged so that they do not overlap with the green color resist resistance strips to thereby alleviate the problem of a visible pattern of the force touch fixed potential electrodes 431 and the floating electrodes 432 so as to improve the display performance of the embedded capacitive touch display panel without degrading a touch effect.

In a particular implementation, in the embedded capacitive touch display panel above according to the embodiment of the application, as illustrated in FIG. 17, the color resist bars 451 generally include red color resist bars and blue color resist bars in addition to the green color resist bars, and the color resist bars of the three colors are generally parallel or substantially parallel to each other. Of course, if the color filter layer 45 further includes color resists of other colors, e.g., yellow color resists, then the color resist bars 451 will further include the yellow color resist bars, although a repeated description thereof will be omitted here.

Particularly in the embedded capacitive touch display panel above according to the embodiment of the application, the first gap sections 433a are arranged so that they do not overlap with the green color resist resistance strips, so the green color resist resistance strips parallel to the first gap sections 433a do not lie in the first gap sections 433a; and there are so lower transmitivities of the red color resists R and the blue color resists B that light transmitted through them will not be easily recognized by human eyes, thus avoiding in effect the pattern of the force touch fixed potential electrodes 431 and the floating electrodes 432 from being visible to human eyes with a normal custom backlight intensity specification, where contribution ratios of the color resists in the respective colors to the display brightness L are as shown in the equation of:

$$L=1.0000R+4.5907G+0.0601B,$$

Where R represents the red color resists, G represents the green color resists, and B represents the blue color resists. As can be apparently seen from the above equation, the green color resists G contribute to the brightness far more than the red color resists R and the green color resists B so that they display more brightly than the adjacent other color resists, and thus are easier to be perceived by human eyes. For the green color resists G with a higher transmitivity, this phenomenon will be more pronounced if the first gap sections 433a are positioned in correspondence to the green color resists G. If the intensity of backlight light sources is raised, or off-state current of TFTs is increased, then the pattern of the force touch fixed potential electrodes 431 and the floating electrodes 432 will become highlighted on a liquid crystal display screen, and particularly if the gaps 433 are positioned in correspondence to the green color resists G, then this phenomenon will become pronounced, thus seriously degrading the quality of display a picture.

Figure 20A:
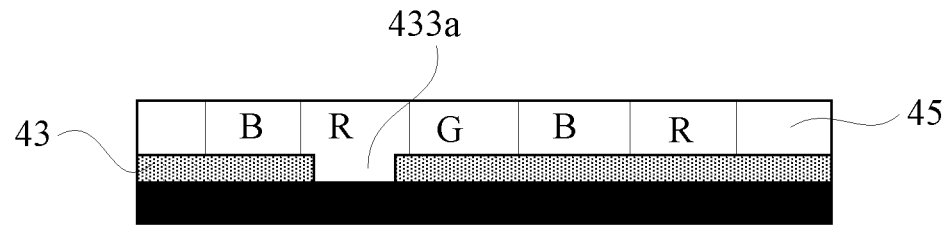
FIG. 20a to FIG. 20d illustrate positional relationships between a first gap section and color resists in the embedded capacitive touch display panel according to the embodiment of the application respectively.
Figure 20B:
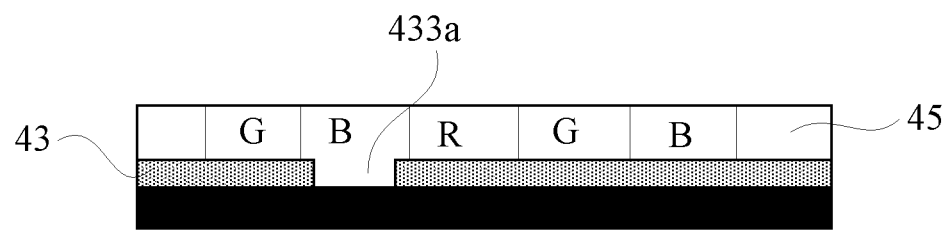
Figure 20C:
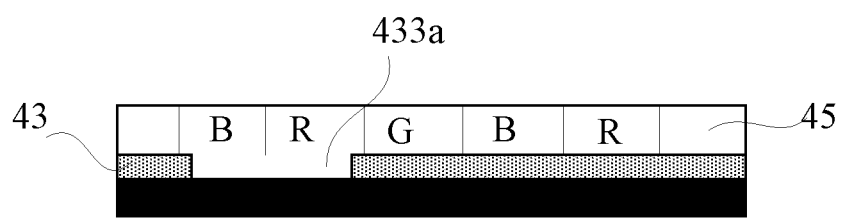
Figure 20D:
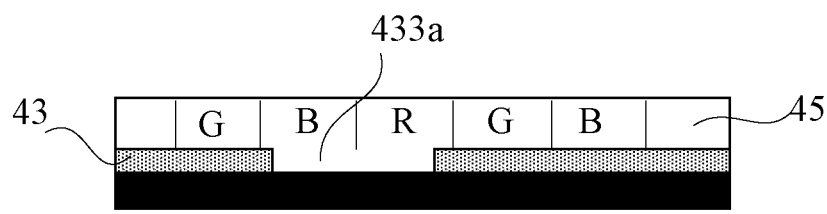

Thus in order to alleviate the problem of the visible pattern of the force touch fixed potential electrodes 431 and the floating electrodes 432 so as to improve the performance of displaying on the embedded capacitive touch display panel without degrading the touch effect, in the embedded capacitive touch display panel above according to the embodiment of the application, as illustrated in FIG. 20a, the first gap sections 433a can be arranged in correspondence to the red color resist bars; or as illustrated in FIG. 20b, the first gap sections 433a can be arranged in correspondence to the blue color resist bars; or as illustrated in FIG. 20c and FIG. 20d, the first gap sections 433a can be arranged in correspondence to the red color resist bars and the blue color resist bars.

Furthermore in order to alleviate the problem of the visible pattern of the force touch fixed potential electrodes 431 and the floating electrodes 432 so as to improve the performance of displaying on the embedded capacitive touch display panel without degrading the touch effect, in the embedded capacitive touch display panel above according to the embodiment of the application, the widths of the respective first gap sections 433a can be set the same to thereby mitigate the differences between the first gap sections 433a.

Moreover in the embedded capacitive touch display panel above according to the embodiment of the application, as illustrated in FIG. 19, the gaps generally further include second gap sections 433b perpendicular to the color resist bars 451.

Alike furthermore in order to alleviate the problem of the visible pattern of the force touch fixed potential electrodes 431 and the floating electrodes 432 so as to improve the performance of displaying on the embedded capacitive touch display panel without degrading the touch effect, in the embedded capacitive touch display panel above according to the embodiment of the application, the widths of the respective second gap sections 433b can be set the same to thereby mitigate the differences between the second gap sections 433b.

In a particular implementation, in the embedded capacitive touch display panel above according to the embodiment of the application, there may be various patterns of the force touch fixed potential electrodes 431 and the floating electrodes 432 of the grid-shaped metal conductive layer 43.

As illustrated in FIG. 18, for example, in order to facilitate an application of a fixed potential, e.g., Ground, to the force touch fixed potential electrodes 431, the force touch fixed potential electrodes 431 can be composed of a number of first metal electrode strips 431a, and a number of second metal electrode strips 431b intersecting the first metal electrode strips 431a, and the respective floating electrodes 432 are located in areas surrounded by every two adjacent first metal electrode strips 431a and every two adjacent second metal electrode strips 431b. That is, the first metal electrode strips 431a and the second metal electrode strips 431b are interconnected into a grid-like structure, and the floating electrode strips 432 are arranged in meshes of the grid-like structure. In another example, the pattern of the force touch fixed potential electrodes 431 can alternatively be composed of a number of electrode blocks, and the force touch fixed potential electrodes 431 and the floating electrodes 432 can be arranged alternately in both the row direction and the column direction, where the respective electrode blocks need to be electrically connected with wires for applying a fixed potential thereto. Moreover in the embedded capacitive touch display panel above according to the embodiment of the application, the area of the smallest grid in the grid-shaped metal conductive layer 43 will not be defined, but particularly the smallest grid can be arranged in corresponding to one or more color resist, and the embodiment of the application will not be limited in this regard.

Figure 21:
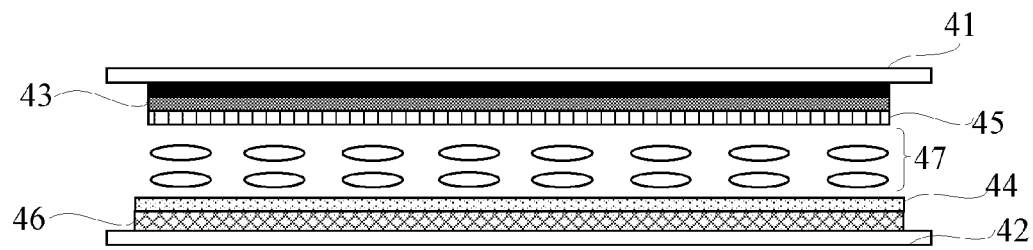
FIG. 21 illustrates a schematic structural diagram of the embedded capacitive touch display panel according to the embodiment of the application, which is an embedded touch screen liquid crystal display.

In a particular implementation, the embedded capacitive touch display panel above according to the embodiment of the application can be particularly an embedded capacitive touch liquid crystal display panel as illustrated in FIG. 21, which further includes a liquid crystal layer 47 arranged between the first transparent substrate 41 and the second substrate 42; or the embedded capacitive touch display panel above according to the embodiment of the application can be particularly an embedded capacitive touch electroluminescence display panel, and the embodiment of the application will not be limited in this regard. The embedded capacitive touch display panel will be described as an embedded capacitive touch liquid crystal display panel throughout the following description by way of an example.

In a particular implementation, in the embedded capacitive touch display panel above according to the embodiment of the application, there may be a number of implementations of a pattern of a number of force touch detection electrodes 44 independent of each other formed on the second substrate 42, several particular examples of which will be described below.

Another Embodiment

In the embedded capacitive touch display panel above according to the embodiment of the application, as illustrated in FIG. 16, the embedded capacitive touch display panel generally further includes pixel units 46 formed on the second substrate 42 so that they are arranged in an array thereon, and a common electrode layer (not illustrated) including force touch detection electrodes 44 arranged in correspondence to the pixel units 46. That is, the common electrode layer can be segmented into the respective force touch detection electrodes 44, which are reused as the common electrode layer. In display phase, a common electrode signal is applied to the respective force touch detection electrodes 44; and in force touch detection phase, the thickness of a liquid crystal box between the first transparent substrate 41 and the second substrate 42 at the section of the first transparent substrate 41 being pressed will be decreased so that the capacitance between the force touch fixed potential electrode 431 and the force touch detection electrode 44 at the section of the first transparent substrate 41 being pressed will be increased, so the pressure condition can be detected by detecting an electric signal of the force touch detection electrode 44. In the meanwhile, if the first transparent substrate 41 is pressed by a human body, then the capacitance between the force touch fixed potential electrode 431 and the force touch detection electrode 44 will be influenced by the capacitance of the human body through the floating electrode 432, and the touch condition can be further detected by detecting the electric signal of the force touch detection electrode 44, that is, the force touch detection electrode 44 can also function to detect a touch, that is, the force touch detection electrode 44 can function as a touch detection electrode.

Another Embodiment

Figure 22:
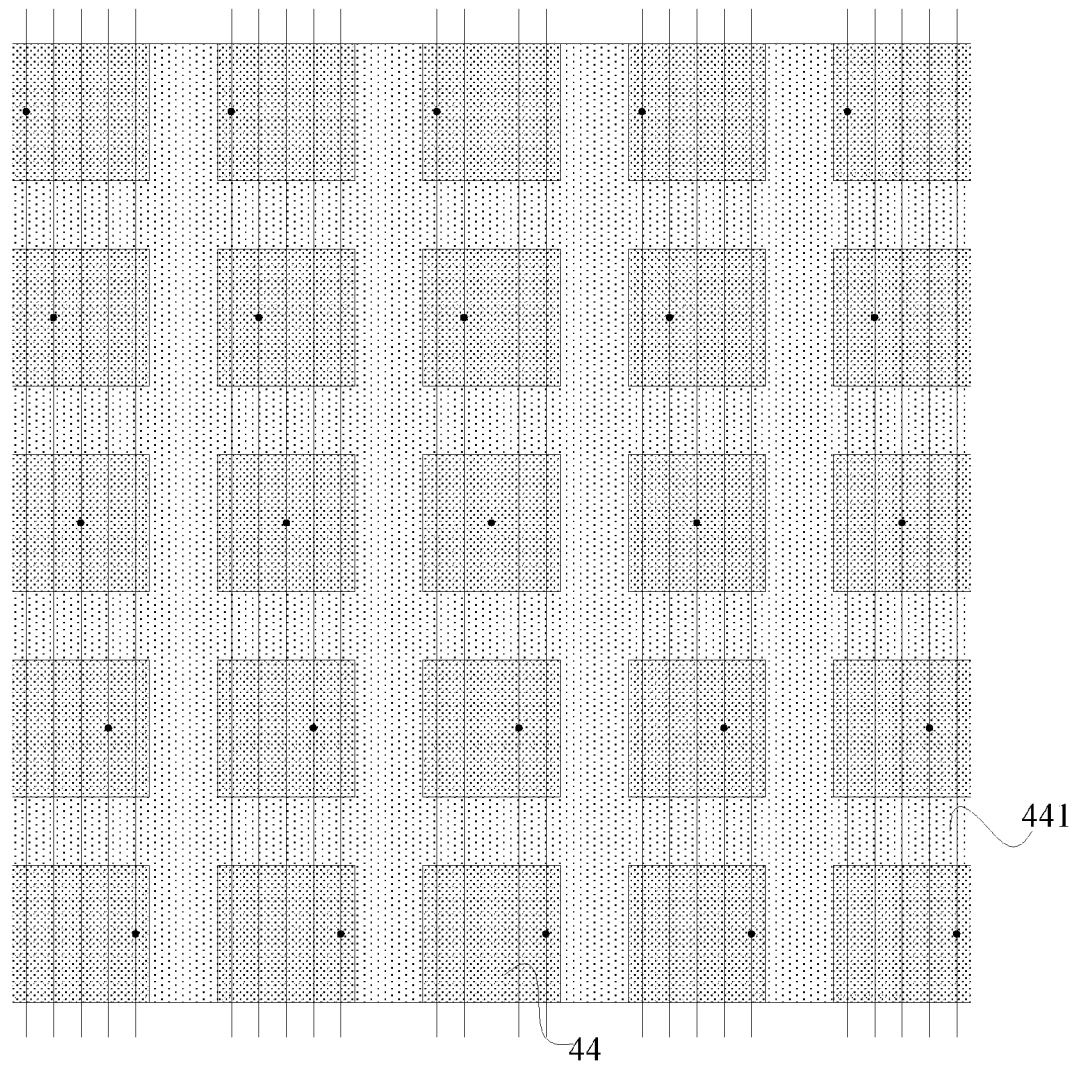
FIG. 22 illustrates a schematic structural diagram of force touch detection electrodes and fixed potential electrodes in the embedded capacitive touch display panel according to the embodiment of the application.

In the embedded capacitive touch display panel above according to the embodiment of the application, as illustrated in FIG. 22, the respective force touch detection electrodes 44 can be reused as touch detection electrodes; and in the meanwhile, fixed potential electrodes 441 can be arranged between the respective force touch detection electrodes 44 to thereby mitigate signal interference between the respective force touch detection electrodes 44. The thickness of a liquid crystal box between the first transparent substrate 41 and the second substrate 42 at the section of the first transparent substrate 41 being pressed will be decreased so that the capacitance between the force touch fixed potential electrode 431 and the force touch detection electrode 44 at the section of the first transparent substrate 41 being pressed will be increased, and here if the first transparent substrate 41 is pressed by a human body, then the capacitance between the force touch fixed potential electrode 431 and the force touch detection electrode 44 will be also influenced by the capacitance of the human body through the floating electrode 432, and both the pressure condition and the touch condition can be detected by detecting the electric signal of the force touch detection electrode 44.

Furthermore in the embedded capacitive touch display panel above according to the embodiment of the application, in order to guarantee the sensitivity of touch detection to thereby enable the force touch detection electrodes 44 to be more easily influenced by the capacitance of the human body, as illustrated in FIG. 22, the respective force touch detection electrodes 44 can be arranged in correspondence to the floating electrodes 432, that is, the force touch detection electrodes 44 are arranged directly below the floating electrodes 432; and the respective fixed potential electrodes 441 can be arranged in correspondence to the force touch fixed potential electrodes 431, that is, the fixed potential electrodes 441 are arranged directly below the force touch fixed potential electrodes 431.

Furthermore in the embedded capacitive touch display panel above according to the embodiment of the application, in order to mitigate signal interference between force touch detection and display, the embedded capacitive touch display panel can be driven in display phase and force touch detection phase in a time division mode. Moreover in order to mitigate RC loading, the common electrode layer can be segmented into the force touch detection electrodes 44 and the fixed potential electrodes 441, that is, the common electrode layer includes the fixed potential electrodes 441 and the force touch detection electrodes 44 arranged in correspondence to the pixel units 46. At this time, a common electrode signal needs to be applied to the respective force touch detection electrodes 44 and fixed potential electrodes 441 in display phase, and the common electrode signal may be further applied to the fixed potential electrodes 441 in force touch detection phase. Moreover as illustrated in FIG. 22, the respective force touch detection electrodes 44 can be connected with corresponding wires through via holes so that the signal is applied to the respective force touch detection electrodes 44, or signals fed back by the force touch detection electrodes 44 are received, through the wires.

Another Embodiment

Figure 23:
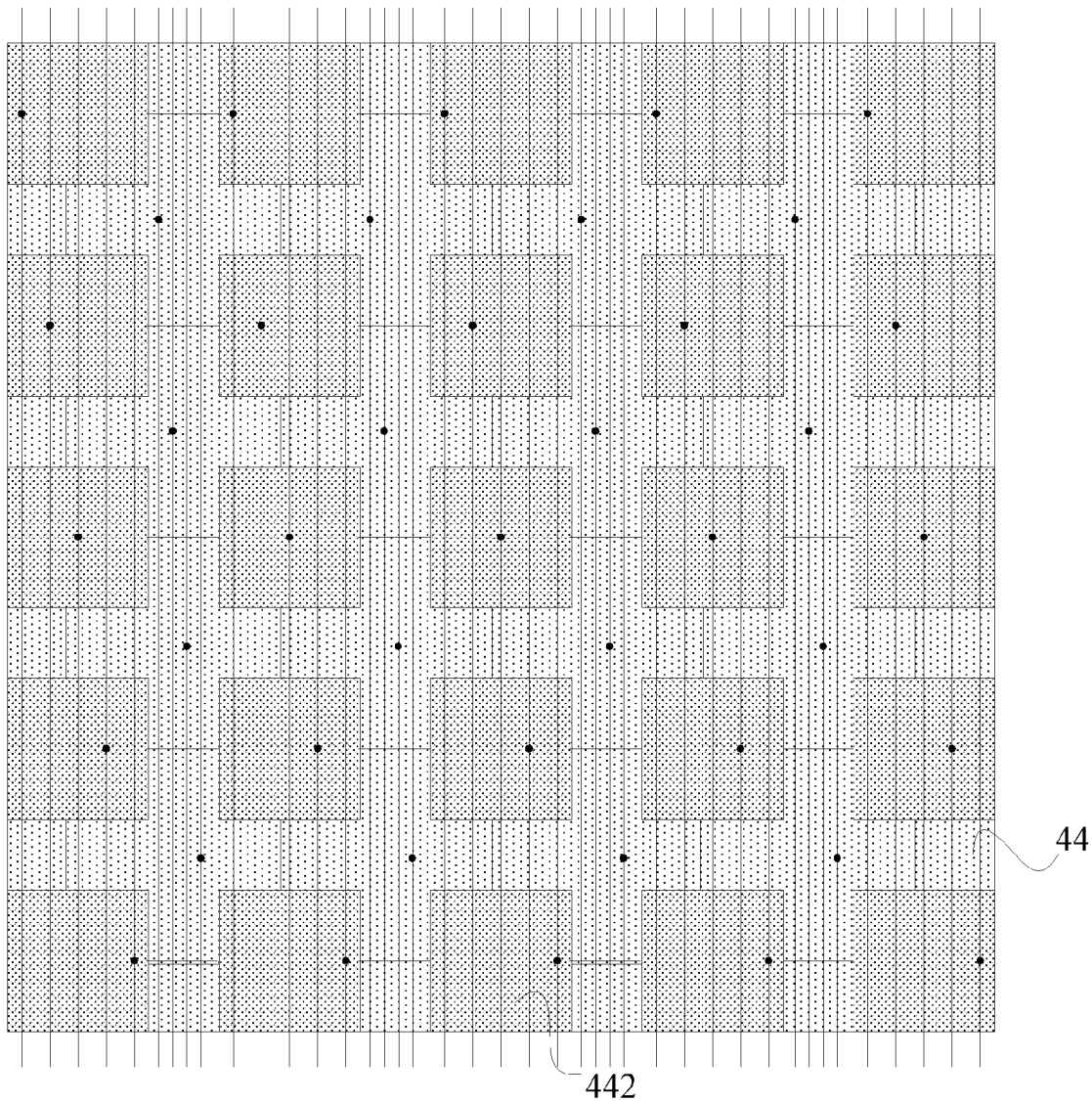
FIG. 23 is a schematic structural diagram of force touch detection electrodes and touch detection electrodes in the embedded capacitive touch display panel according to the embodiment of the application.

In the embedded capacitive touch display panel above according to the embodiment of the application, as illustrated in FIG. 23, a number of touch detection electrodes 442 independent of each other can be arranged between the respective force touch detection electrodes 44, that is, force touch detection and touch detection is performed respectively by the different nodes. The thickness of a liquid crystal box between the first transparent substrate 41 and the second substrate 42 at the section of the first transparent substrate 41 being pressed will be decreased so that the capacitance between the force touch fixed potential electrode 431 and the force touch detection electrode 44 at the section of the first transparent substrate 41 being pressed will be increased, so the pressure condition can be detected by detecting an electric signal of the force touch detection electrode 44. In the meanwhile, if the first transparent substrate 41 is pressed by a human body, then the capacitance of the touch detection electrode 442 will be influenced by the capacitance of the human body through the floating electrode 432, and the touch condition can be further detected by detecting an electric signal of the touch detection electrode 442.

Furthermore in the embedded capacitive touch display panel above according to the embodiment of the application, in order to guarantee the sensitivity of touch detection to thereby enable the touch detection electrodes 442 to be more easily influenced by the capacitance of the human body, as illustrated in FIG. 23, the respective force touch detection electrodes 44 can be arranged in correspondence to the force touch fixed potential electrodes 431, that is, the force touch detection electrodes 44 are arranged directly below the force touch fixed potential electrodes 431; and the respective touch detection electrodes 442 can be arranged in correspondence to the floating electrodes 432, that is, the touch detection electrodes 442 are arranged directly below the floating electrodes 432.

Furthermore in the embedded capacitive touch display panel above according to the embodiment of the application, in order to mitigate signal interference between pressure detection and display, the embedded capacitive touch display panel can be driven in display phase and force touch/touch detection phase in a time division mode. Moreover in order to mitigate RC loading, the common electrode layer can be segmented into the force touch detection electrodes 44 and the touch detection electrodes 442, that is, the common electrode layer includes the touch detection electrodes 442 and the force touch detection electrodes 44 arranged in correspondence to the pixel units 46. At this time, a common electrode signal needs to be applied to the respective force touch detection electrodes 44 and touch detection electrodes 442 in display phase, and the force touch detection electrodes 44 and the touch detection electrodes 442 may detect in a time division mode or concurrently in force touch detection phase, although the embodiment of the application will not be limited in this regard. Moreover as illustrated in FIG. 23, the respective force touch detection electrodes 44 and touch detection electrodes 442 can be connected with corresponding wires through via holes so that the signal is applied to the respective force touch detection electrodes 44 and touch detection electrodes 442, or signals fed back by the force touch detection electrodes 44 and touch detection electrodes 442 are received, through the wires.

Another Embodiment

Figure 24:
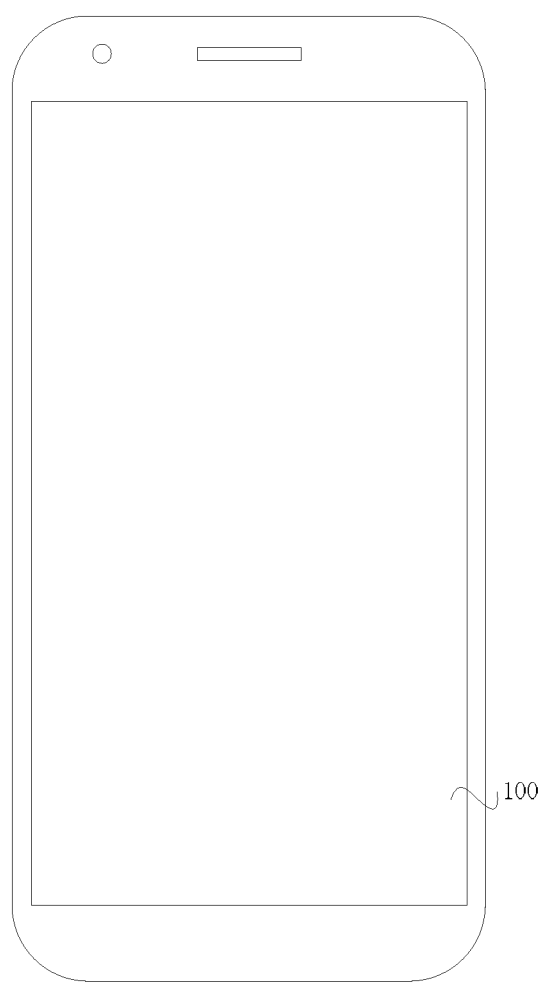
FIG. 24 is a schematic structural diagram of an embedded capacitive touch display device according to an embodiment of the application.

Based upon the same inventive concept, an embodiment of the application further provides an embedded capacitive touch display device as illustrated in FIG. 24 including the embedded capacitive touch display panel 100 above, where the display device can be a mobile phone, a tablet computer, a TV set, a display, a notebook computer, a digital photo frame, a navigator, or any other product or component capable of displaying. Reference can be made for the embodiments of the embedded capacitive touch display panel above for an implementation of the display device, so a repeated description thereof will be omitted here.

The embedded capacitive touch display panel and the embedded capacitive touch display device above according to the embodiments of the application include: a first transparent substrate and a second substrate arranged opposite to each other, a grid-shaped metal conductive layer formed on the first transparent substrate, and a number of force touch detection electrodes independent of each other formed on the second substrate; and the embedded capacitive touch display panel further includes a color filter layer including at least red color resists, green color resists, and blue color resists, where the color resists in the same colors are arranged in respective color resist bars, and the color resist bars include green color resist resistance strips; and the grid-shaped metal conductive layer includes periodically arranged force touch fixed potential electrodes and floating electrodes, where the force touch fixed potential electrodes are separate from the floating electrodes with gaps being formed between them, and the gaps include first gap sections which are parallel to the color resist bars, and which do not overlap with the green color resist resistance strips. Since the green color resists contribute to display brightness far more than the color resists of the other colors, the first gap sections can be arranged so that they do not overlap with the green color resist resistance strips to thereby alleviate the problem of a visible pattern of the force touch fixed potential electrodes and the floating electrodes so as to improve the display performance of the embedded capacitive touch display panel without degrading the touch effect.

Each part in the specification is described in a progressive mode, what is highlighted in each part is different from that in other parts, and for the same or similar parts between all the parts, reference could be made to each other.

For the above-mentioned illustration of the disclosed embodiments, those skilled in the art may realize or use the present application. Multiple modifications of these embodiments are obvious for those skilled in the art, and general principles defined herein may be realized in other embodiments without departing from the spirit or scope of the present application. Accordingly, the present application will not be limited to the embodiments shown herein, but accords with the widest scope consistent with the principles and novel characteristics disclosed herein.

What is claimed is:

1. An embedded capacitive touch display panel, comprising: a first transparent substrate and a second substrate arranged opposite to each other, a grid-shaped metal conductive layer formed on the first transparent substrate, and a number of force touch detection electrodes independent of each other formed on the second substrate, wherein:

the embedded capacitive touch display panel further comprises a color filter layer comprising at least red color resists, green color resists, and blue color resists, wherein the color resists in the same colors are arranged in respective color resist bars, and the color resist bars comprise green color resist resistance strips; and the grid-shaped metal conductive layer comprises periodically arranged force touch fixed potential electrodes and floating electrodes, wherein the force touch fixed potential electrodes are separate from the floating electrodes with gaps being formed between them, and the gaps comprise first gap sections which are parallel to the color resist bars, and which do not overlap with the green color resist resistance strips.

2. The embedded capacitive touch display panel according to claim 1, wherein the color resist bars further comprise red color resist bars and blue color resist bars, and the color resist bars of the three colors are parallel or substantially parallel to each other.

3. The embedded capacitive touch display panel according to claim 2, wherein the first gap sections are arranged in correspondence to the red color resist bars; and/or the first gap sections are arranged in correspondence to the blue color resist bars.

4. The embedded capacitive touch display panel according to claim 1, wherein the gaps further comprise second gap sections perpendicular to the color resist bars.

5. The embedded capacitive touch display panel according to claim 1, wherein the force touch fixed potential electrodes are composed of a number of first metal electrode strips, and a number of second metal electrode strips intersecting the first metal electrode strips, and the respective floating electrodes are located in areas surrounded by every two adjacent first metal electrode strips and every two adjacent second metal electrode strips.

6. The embedded capacitive touch display panel according to claim 1, wherein the embedded capacitive touch display panel further comprises: pixel units formed on the second substrate so that they are arranged in an array thereon; and a common electrode layer comprising force touch detection electrodes arranged in correspondence to the pixel units.

7. The embedded capacitive touch display panel according to claim 1, wherein the respective force touch detection electrodes are reused as touch detection electrodes; and fixed potential electrodes are arranged between the respective force touch detection electrodes.

8. The embedded capacitive touch display panel according to claim 7, wherein the respective force touch detection electrodes are arranged in correspondence to the floating electrodes; and the respective fixed potential electrodes are arranged in correspondence to the force touch fixed potential electrodes.

9. The embedded capacitive touch display panel according to claim 7, wherein the embedded capacitive touch display panel further comprises: pixel units formed on the second substrate so that they are arranged in an array thereon; and a common electrode layer comprising the fixed potential electrodes and the force touch detection electrodes arranged in correspondence to the pixel units.

10. The embedded capacitive touch display panel according to claim 1, wherein a number of touch detection electrodes independent of each other are arranged between the respective force touch detection electrodes.

11. The embedded capacitive touch display panel according to claim 10, wherein the respective force touch detection electrodes are arranged in correspondence to the force touch fixed potential electrodes; and the respective touch detection electrodes are arranged in correspondence to the floating electrodes.

12. The embedded capacitive touch display panel according to claim 10, wherein the embedded capacitive touch display panel further comprises: pixel units formed on the second substrate so that they are arranged in an array thereon; and a common electrode layer comprising the force touch detection electrodes and the touch detection electrodes arranged in correspondence to the pixel units.

13. An embedded capacitive touch display device, comprising an embedded capacitive touch display panel, wherein the embedded capacitive touch display panel comprises: a first transparent substrate and a second substrate arranged opposite to each other, a grid-shaped metal conductive layer formed on the first transparent substrate, and a number of force touch detection electrodes independent of each other formed on the second substrate, wherein:

the embedded capacitive touch display panel further comprises a color filter layer comprising at least red color resists, green color resists, and blue color resists, wherein the color resists in the same colors are arranged in respective color resist bars, and the color resist bars comprise green color resist resistance strips; and the grid-shaped metal conductive layer comprises periodically arranged force touch fixed potential electrodes and floating electrodes, wherein the force touch fixed potential electrodes are separate from the floating electrodes with gaps being formed between them, and the gaps comprise first gap sections which are parallel to the color resist bars, and which do not overlap with the green color resist resistance strips.

* * * * *